United States Patent
Morise et al.

(10) Patent No.: US 6,572,041 B2
(45) Date of Patent: Jun. 3, 2003

(54) FISHING-LINE GUIDING MECHANISM FOR SPINNING REEL

(75) Inventors: Taisei Morise, Sakai (JP); Yasuhiro Hitomi, Hashimoto (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/045,091

(22) Filed: Jan. 15, 2002

(65) Prior Publication Data

US 2002/0096588 A1 Jul. 25, 2002

(30) Foreign Application Priority Data

Jan. 24, 2001 (JP) ........................................ 2001-015597
Jan. 24, 2001 (JP) ........................................ 2001-015598

(51) Int. Cl.[7] ............................................. A01K 89/01
(52) U.S. Cl. ................................... 242/231; 242/157 R
(58) Field of Search ............................... 242/231, 232, 242/157 R (56) References Cited

U.S. PATENT DOCUMENTS

| 3,834,644 | A | | 9/1974 | Stackawicz | |
| 4,982,912 | A | * | 1/1991 | Urso | 242/231 |
| 5,379,958 | A | * | 1/1995 | Takeuchi | 242/232 |
| 5,662,283 | A | * | 9/1997 | Puryear et al. | 242/233 |
| 5,667,159 | A | * | 9/1997 | Carpenter et al. | 242/233 |
| 5,673,867 | A | * | 10/1997 | Takeuchi | 242/231 |
| 5,743,478 | A | * | 4/1998 | Plestan | 242/231 |
| 5,813,620 | A | * | 9/1998 | Yamaguchi et al. | 242/232 |
| 5,839,681 | A | * | 11/1998 | Kaneko | 242/231 |
| 5,845,858 | A | * | 12/1998 | Amano et al. | 242/231 |
| 6,149,088 | A | | 11/2000 | Bernard et al. | |

FOREIGN PATENT DOCUMENTS

| FR | 940496 | 12/1948 |
| JP | 2000-236784 A | 9/2000 |
| JP | 2001-61382 A | 3/2001 |

* cited by examiner

Primary Examiner—Emmanuel Marcelo
(74) Attorney, Agent, or Firm—Shinjyu Global IP Counselors, LLP (57) ABSTRACT

Spinning-reel bail arm is provided on the fore-ends of first and second rotor arms to let it pivot between a line-guiding posture and a line-releasing posture, and is furnished with: first and second bail-support members mounted pivotally on the fore-ends of the first and second rotor arms; a line roller provided on the fore end of the first bail-support member; a stationary shaft that rotatively carries the line roller; a stationary-shaft cover; a bail that interconnects the stationary shaft cover and the second bail-support member; and a line-slack preventing part. The line-slack preventing part has a fishing-line piloting surface for piloting fishing line toward the line roller and is situated on the side of the first bail-support member from which the stationary shaft projects, such that the line-slack preventing part projects from the first bail-support member.

20 Claims, 10 Drawing Sheets

FISHING-LINE GUIDING MECHANISM FOR SPINNING REEL

BACKGROUND OF THE INVENTION

1. Field of the Invention

This invention generally relates to fishing-line guiding mechanisms. More specifically, the present invention relates to spinning-reel fishing-line guiding mechanisms provided at the fore-ends of a pair of rotor arms for guiding fishing line onto the spool.

2. Background Information

Fishing-line guiding mechanisms are provided on spinning reels for guiding fishing line onto the spool. The fishing-line guiding mechanism is furnished with: a pair of bail-support members carried pivotally on the fore-ends of the pair of rotor arms; a stationary shaft whose one end is fixed to the fore end of one of the bail-support members; a stationary shaft cover fixed to the other end of the stationary shaft; a bail one end of which is attached to the stationary shaft cover; and a line roller. The one end of the bail is bent over and fixedly inserted into the lateral vertex portion of the stationary shaft cover. The line roller is carried rotatively on the stationary shaft in between the stationary shaft cover and the bail-support member.

When winding fishing line onto the spool in a spinning reel having this sort of fishing-line guiding mechanism, the bail is swung over into a line-retrieving posture, and the handle is cranked. The fishing line is thus piloted by the bail over the stationary shaft cover, and guided into contact with the circumferential surface of the line roller. Then, winding outer-circumferentially onto the spool, the fishing line changes direction guided on the line roller.

Sometimes with the foregoing conventional fishing-line guiding mechanisms, during a weakening in the tension on the fishing line, such as when a fish gets off the terminal tackle while retrieving the fishing line, so-called line-slack, in which the fishing line parts from the line roller, will occur. The line-slack often happens in lightweight lure fishing such as trout fishing that uses fine fishing lines. Occurrences of line-slack may lead to problems such as the fishing line parting rearward from the bobbin portion of the spool and further encroaching into and snarling in the spool interior, and/or the fishing line becoming tangled. Cranking the handle while the fishing line is in such situation will make the fishing line prone to tangling on the bail-support member or the spool. When the fishing line snarls on the bail-support member or the spool, the handle can no longer be rotated, and the fishing line snaps or else gets further entangled on some other part.

In view of the above, there exists a need for a spinning reel fishing line guiding mechanism which overcomes the above mentioned problems in the prior art. This invention addresses this need in the prior art as well as other needs, which will become apparent to those skilled in the art from this disclosure.

SUMMARY OF THE INVENTION

An object of the present invention is to prevent inconveniences with spinning-reel fishing-line guiding mechanisms that occur due to line slack.

According to a first aspect of the present invention, a spinning-reel fishing-line guiding mechanism is provided, to let it pivot between a line-guiding posture and a line-releasing posture, on the fore-ends of first and second rotor arms of a rotor disposed frontward on the spinning-reel reel body; and is a mechanism that when in the line-guiding posture guides fishing line onto the spool, and comprises: first and second bail-support members, a line roller, a stationary shaft, a stationary shaft cover, a bail, and a line-slack preventing part. The first and second bail-support members are fitted pivotally on the fore-ends of the first and second rotor arms. The line roller is provided on the fore end of the first bail-support member, where it guides the fishing line onto the spool. The stationary shaft is a rod projecting from the fore end of the first bail-support member, where it rotatively carries the line roller. The outer diameter of the stationary shaft cover, which is provided on the fore end of the stationary shaft, is larger than the outer diameter of the liner roller. The bail interconnects the stationary shaft cover and the second bail-support member, wherein it guides the fishing line onto the line roller. The line-slack preventing part is situated on, and projects beyond the rest of, the side of the first bail-support member from which the stationary shaft projects, and has a fishing-line piloting surface that pilots the fishing line toward the line roller.

In such the mechanism, when the handle is cranked in the state in which the bail is locked into the line-retrieving posture in this fishing-line guiding mechanism, the fishing line, conducted by the bail, is guided over the stationary shaft cover and into contact with the circumferential surface of the line roller. In this situation—when tension is acting on the fishing line—the line roller guides the fishing line smoothly onto the spool, but if the fishing-line tension weakens, the fishing line will tend to part off the line roller. Nevertheless because a line-slack preventing part is arranged on, projecting beyond the rest of, the side of the first bail-support member from which the stationary shaft projects, and moreover because a fishing-line piloting surface that pilots the fishing line toward the line roller is provided on the line-slack preventing part, though line-slack wherein the fishing line parts off the line roller occurs, the moment that tension acts on the fishing line, it is guided back onto the line roller. Consequently, even if the fishing-line tension weakens and the line goes slack, it is unlikely to bring about inconvenience.

According to a second aspect of the present invention, in a spinning-reel fishing-line guiding mechanism as in the first aspect, wherein the line-slack preventing part has a line-slack preventing portion situated opposing a fishing-line guiding section of the line roller. In this case, the fact that a line-slack preventing portion is arranged opposing a fishing-line guiding section of the line roller means that even if the fishing-line tension weakens, line-slack is not apt to occur.

According to third aspect of the present invention, in a spinning-reel fishing-line guiding mechanism as in the second aspect, wherein the line-slack preventing part has an engaging recess situated opposing the line roller and enabling engagement with the fishing line. Because in this case the engaging recess facilitates preventing the fishing line from parting, in the line-roller axial direction, off the area opposing the line roller, line-slack is unlikely to occur.

According to fourth aspect of the present invention, in a spinning-reel fishing-line guiding mechanism as in any of the first to third aspects, wherein the first bail-support member has a round attaching portion that attaches pivotally to the first rotor arm, a round roller-support portion affixed to the stationary shaft and into which the line roller is fitted, and a connecting portion, molded at approximately uniform thickness, that connects the attaching portion and the roller support portion; and wherein the line-slack preventing part is a rib formed on the connecting portion and projecting in the direction the stationary shaft projects. In this case, the line-slack preventing part is formed integrally with the first bail-support member, which compared with instances where the configuration is by separate elements therefore holds down weight increase, keeps the rotational balance from wavering, and inexpensively controls line-slack.

According to fifth aspect of the present invention, in a spinning-reel fishing-line guiding mechanism as in any of the first to third aspects, wherein the line-slack preventing part is a pivoting member disposed on the side of the first bail-support member that is toward the spool, and is mounted on the first rotor arm, coaxially with the first bail-support member, where it pivots linked with the first bail-support member. In this case, the fact that the line-slack preventing part is a separate member from yet pivots together with the first bail-support member increases the degrees of freedom in conformational design beyond establishing it either integrally or integratively with the first bail-support member; and at the same time means that a structure for affixing to or interlocking with the first bail-support member is unnecessary.

According to sixth aspect of the present invention, in a spinning-reel fishing-line guiding mechanism as in the fifth aspect, wherein the pivoting member, when the first bail-support member pivots from the line-guiding posture to the line-releasing posture, pivots lagging the first bail-support member by a predetermined angle. In this case, because the line-slack preventing part pivots laggingly, when the fishing-line guiding mechanism is pivoted into the line-releasing posture, a phase difference with the line-slack preventing part is created such that that in the line-releasing posture fishing line parting off the line roller will not get in the way.

According to seventh aspect of the present invention, in a spinning-reel fishing-line guiding mechanism as in any of the first to sixth aspects, wherein an outer peripheral portion of the first bail-support member is established on a sphere whose radius is a first distance at which a distance between the outer peripheral portion and a predetermined reference point becomes maximum and is formed into a curved-surface contour such that the distance between the outer peripheral portion and the reference point becomes heading outward gradually smaller than the first distance. In this case, by setting as a predetermined reference point an arbitrary position at which there is a possibility of a line snarl arising, a sphere is defined whose radius is the maximum distance of the interval from the reference point to the outer peripheral portion of the first bail-support member; and the outer peripheral portion of the first bail-support member is disposed on the sphere. The first bail-support member is then formed into a curved-surface contour such that the distance between the reference point and the outer peripheral portion becomes gradually smaller heading outwardly along where the fishing line is guidable. Herein, even if, for example, a line snarl arises at the predetermined reference point and the fishing line snags on the outer periphery of the first bail-support member, the line-retrieving operation shifts the snag position on the outer periphery of the first bail-support member outward—where the reference point is center—and it comes right off, simultaneously with which the line snarl at the reference point is disentangled. Accordingly, line snarls are readily unsnarled. Nevertheless, because a hard coating-film is formed onto its outer periphery, the first bail-support member is not liable to become scratched when the fishing line shifts while scraping on it.

According to eighth aspect of the present invention, in a spinning-reel fishing-line guiding mechanism as in the seventh aspect, wherein the reference point is the juncture between the stationary-shaft cover and the bail. In this case, by setting as the reference point the juncture between the stationary shaft cover and the bail—where line snarls are apt to occur—though line snarls might arise at the reference point, the line snarls readily untangle.

According to ninth aspect of the present invention, in a spinning-reel fishing-line guiding mechanism as in any of the first to eighth aspects, wherein the first and second bail-support members are pivotally supported by the first and second rotor arms on their outer sides. In this case, the clearances between the spool and the two rotor arms may be made smaller.

According to tenth aspect of the present invention, in a spinning-reel fishing-line guiding mechanism as in any of the first to ninth aspects, wherein the first bail-support member has a hard coating-film on its outer periphery.

With this fishing-line guiding mechanism, casting is carried out by pivoting the fishing-line guiding mechanism into the line-releasing posture. In this situation, slack in the fishing line at times arises due to the impact of winds, and the line scrapes on the outer periphery of the first bail-support member. Herein, the fact that a hard coating-film is formed on the outer periphery of the first bail-support member lends the outer periphery a high degree of hardness to keep the outer periphery of the first bail-support member from becoming scratched though fishing line gone slack scrapes on it. Moreover, wherein a smooth surface is imparted by a hard metallic coating-film, fishing line slides easily on the first bail-support member, which keeps the fishing line from snarling on the first bail-support member. Here, the metal hard coating-film is formable by every type of thin-film formation method, such as: every sort of plating method, such as electrolytic plating methods and non-electrolytic plating methods; every sort of physical vapor deposition (PVD) method, such as vacuum vapor-deposition methods, sputtering methods, and ionic plating; as well as every sort of chemical vapor-deposition method, such as plasma CVD and organic metal CVD.

According to eleventh aspect of the present invention, in a spinning-reel fishing-line guiding mechanism as in the tenth aspect, wherein the first bail-support member is made of synthetic resin; and the hard coating-film is formed by a metal-plating process. In this case, the metal-plating process facilitates forming the smooth hard coating-film.

According to twelfth aspect of the present invention, in a spinning-reel fishing-line guiding mechanism as in the tenth aspect, wherein the first bail-support member is made of synthetic resin; and the hard coating-film is formed by a process of hardening a paint film formed through a paint-coating process. In this case, the paint-film-hardening process enables low-cost formation of the hard coating-film.

According to thirteenth aspect of the present invention, in a spinning-reel fishing-line guiding mechanism as in any of the tenth to twelfth aspects, wherein the stationary-shaft cover is synthetic-resin manufactured, and the hard coating-film is formed on its surface. In this case, the fact that a hard coating-film is formed on the stationary cover too means that the stationary-shaft cover is not liable to become scratched while the fishing-line guiding mechanism is put into its line-guiding posture after casting and the fishing line passes from the bail over the stationary-shaft cover and is guided onto the line roller.

According to fourteenth aspect of the present invention, in a spinning-reel fishing-line guiding mechanism as in any of the tenth to twelfth aspects, wherein the stationary-shaft cover is made of metal and is formed unitarily with the stationary shaft. In this case, the number of parts is lessened and the cost is curtailed because the stationary-shaft cover and the stationary shaft are formed as one.

According to fifteenth aspect of the present invention, in a spinning-reel fishing-line guiding mechanism as in the thirteenth or fourteenth aspect, wherein the fore end of the stationary-shaft cover is generally a round cone shape, and a ridgeline portion in the vicinity of the round cone's apex is joined smoothly with one end of the bail. In this case, a step-off in the joint section between the bail and the stationary shaft cover is not liable to occur, and therefore fishing line is not likely to snag in being guided from the bail to the stationary shaft cover, which makes the fishing line slide more satisfactorily.

According to sixteenth aspect of the present invention, in a spinning-reel fishing-line guiding mechanism as in any of the eleventh to thirteenth aspects, wherein the first bail-support member or the stationary-shaft cover is any one of: ABS (acrylonitrile butadiene styrene) resin, PC (polycarbonate) resin, polyester resin, polypropylene resin, and vinyl chloride resin, or is a synthetic resin manufacture in which these are mixed. In this case, forming the hard coating-film, by, e.g., an electroless plating method, onto the surface of these synthetic resins compared with others is easy.

According to seventeenth aspect of the present invention, in a spinning-reel fishing-line guiding mechanism as in the sixteenth aspect, wherein the first bail-support member or the stationary-shaft cover is a synthetic resin manufacture in which the ABS and the PC are mixed in a range of 40:60 to 60:40. These conditions sustain strength to ease the superficial formation of the hard coating-film.

According to eighteenth aspect of the present invention, in a spinning-reel fishing-line guiding mechanism as in the eleventh or thirteenth aspects, wherein the hard coating-film is a palladium (Pd) plating layer formed by means of an electroless plating process. The hard coating-film in this case may be formed less expensively than chrome or like plating derived from an electrolytic plating method; meanwhile, the surface is made more even and smooth, which makes the fishing line slide easily.

According to ninteenth aspect of the present invention, in a spinning-reel fishing-line guiding mechanism as in any of the tenth, thirteenth, fourteenth, and fifteenth aspects, wherein the first bail-support member is made of a light metal, and the hard coating-film is a ceramic whose chief component is a metal oxide substance. A hard coating-film in this case may be simply obtained even using a comparatively soft metal.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
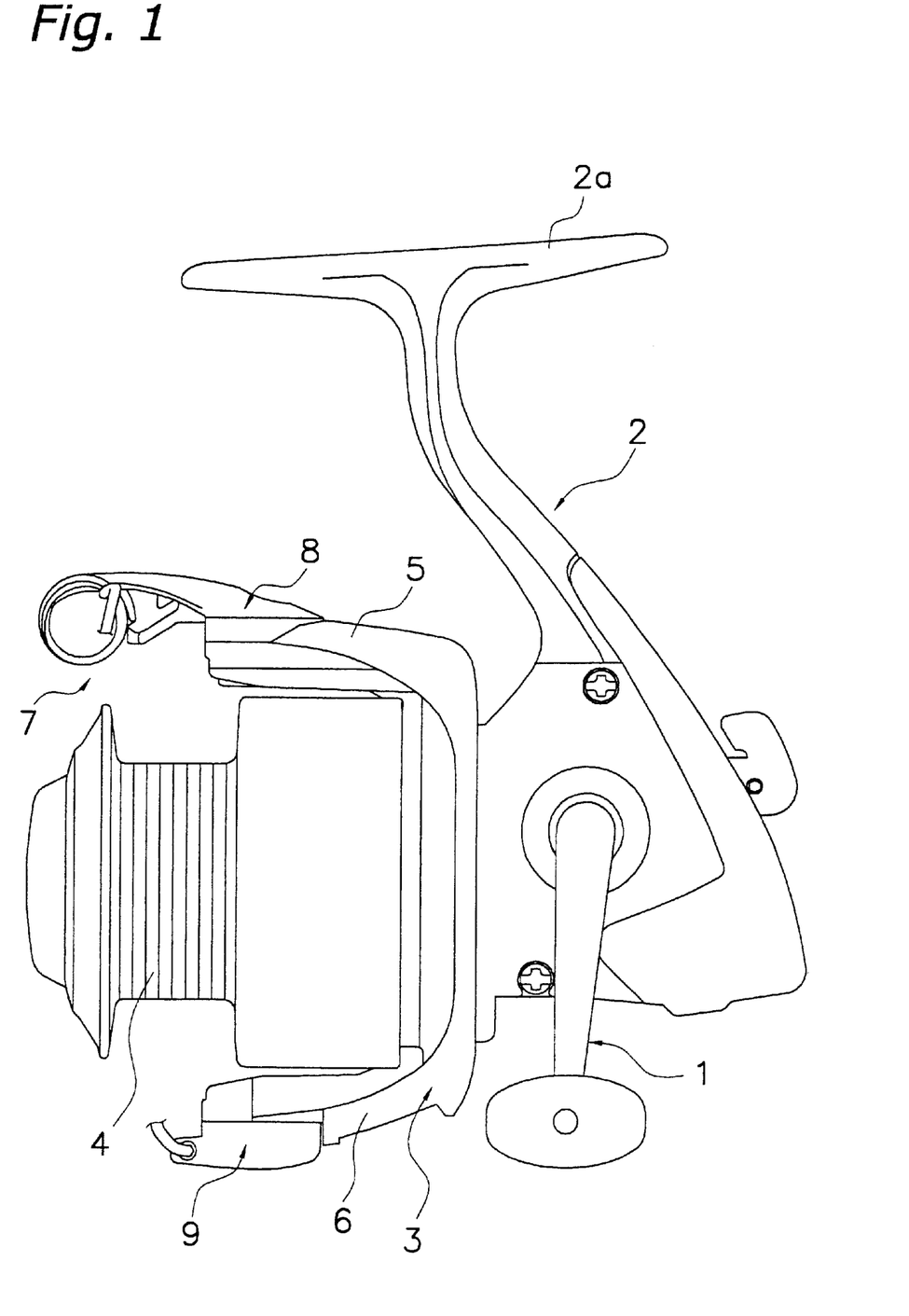
FIG. 1 is a lateral view of a spinning reel according to one embodiment of the present invention.

The spinning reel shown in FIG. 1 is furnished with: a reel body 2 having a handle 1; a rotor 3 carried rotatively in the front portion of the reel body 2; and a spool 4 onto which fishing line winds, arranged on the front of the rotor 3.

A rod-mounting part 2a for attaching the spinning reel to a fishing rod is formed on the top of the reel body 2. In the interior of the reel body 2, furthermore, a rotor-drive mechanism for rotating the rotor 3, and a level-wind mechanism for pumping the spool 4 back and forth along its rotational center axis to wind fishing line uniformly onto the spool 4, are provided.

The rotor 3 has a first rotor arm 5 and a second rotor arm 6 extending frontward along the rotational axis; the two rotor arms 5, 6 are disposed opposing each other. A bail arm 7 as a fishing-line guiding mechanism is pivotally mounted on the fore-ends of the two rotor arms 5, 6. The bail arm 7 swings between a line-releasing posture and a line-retrieving posture, and moreover, returns from the line-releasing posture to the line-retrieving posture by means of a bail-flipping mechanism (not illustrated) linked to rotation of the handle 1 in the line-retrieving direction.

Bail Arm Configuration

Figure 2:
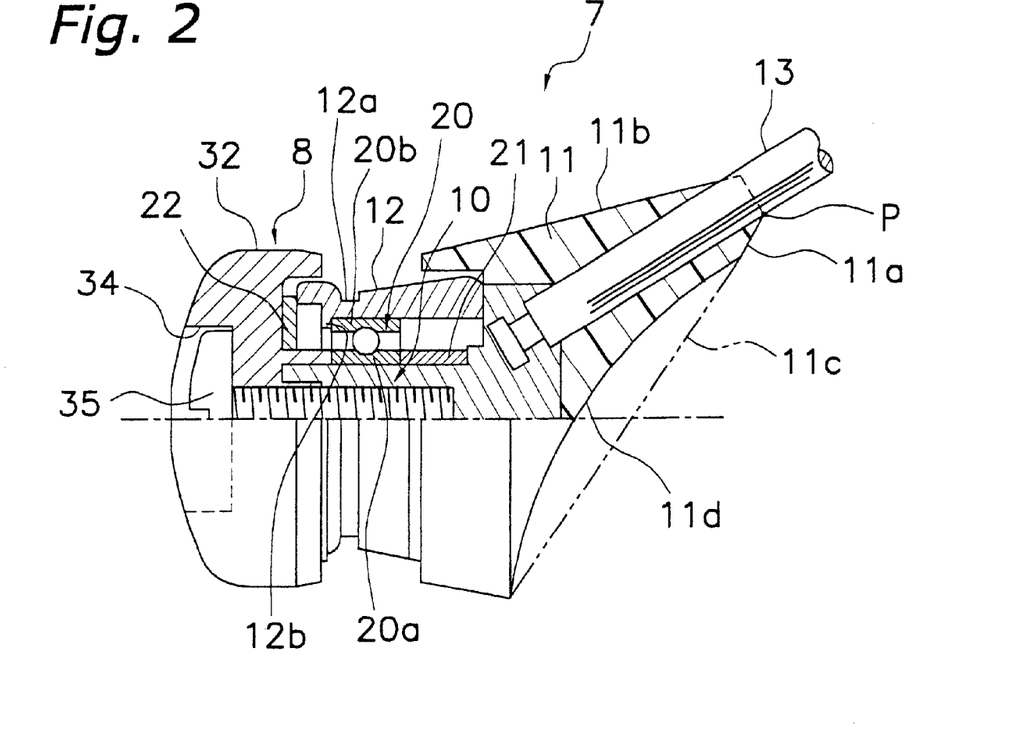
FIG. 2 is a sectional half cut-away view of essentials in the distal end of a bail arm.
Figure 3:
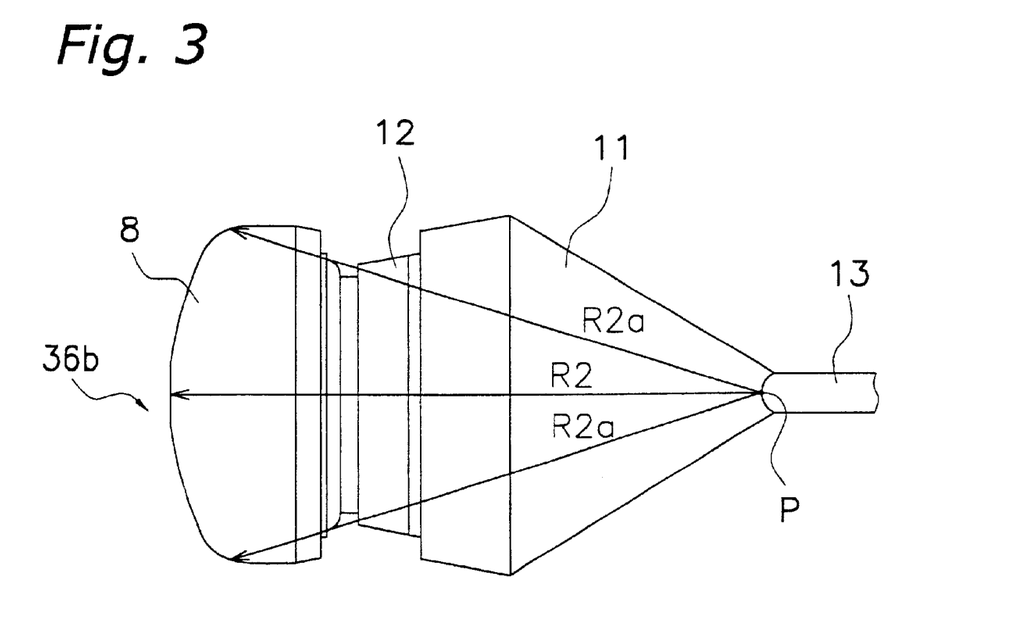
FIG. 3 is a plan view of the distal end of the bail arm.

The rotor arm 7 is furnished with: a first bail-support member 8 mounted pivotally on the fore end of the first rotor arm 5, and a second bail-support member 9 is mounted pivotally on the fore end of the second rotor arm 9. Further, the bail arm 7 has, as shown in FIGS. 2 and 3: a stationary shaft 10, one end of which is affixed to the fore end of the first bail-support member 8; a stationary-shaft cover 11 provided on the other end of the stationary shaft 10, spaced at a separation from the first bail-support member 8; a line roller 12 carried rotatively on the stationary shaft 10; and a bail 13 provided stretching between the second bail-support member 9 and the stationary-shaft cover 11. The first bail-support member 8 is mounted pivotally on the outer side of the fore end of the first rotor arm 5. The second bail-support member 9 is mounted pivotally on the outer side of the fore end of the second rotor arm 6. These two bail-support members first bail-support member 8 and second bail-support member 9 are manufactured of a high-strength synthetic resin.

Figure 4:
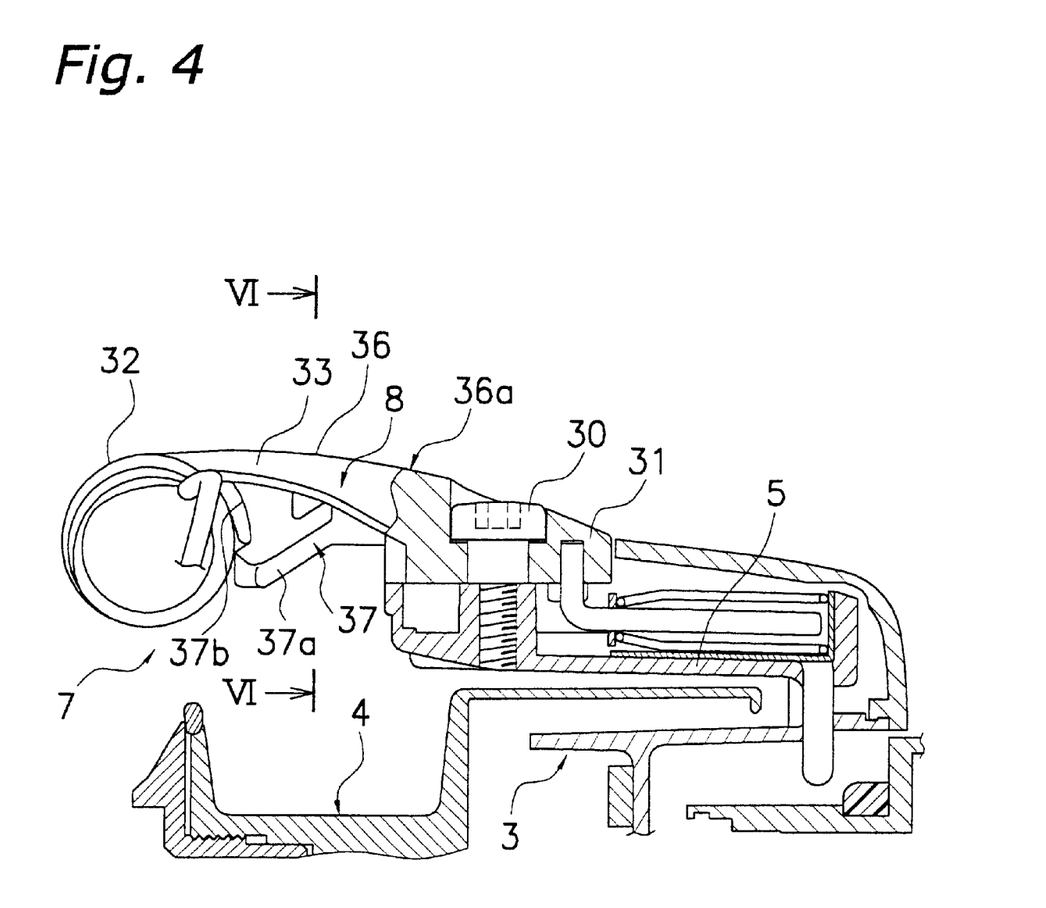
FIG. 4 is a partly in section depiction on the first bail-support member end.
Figure 5:
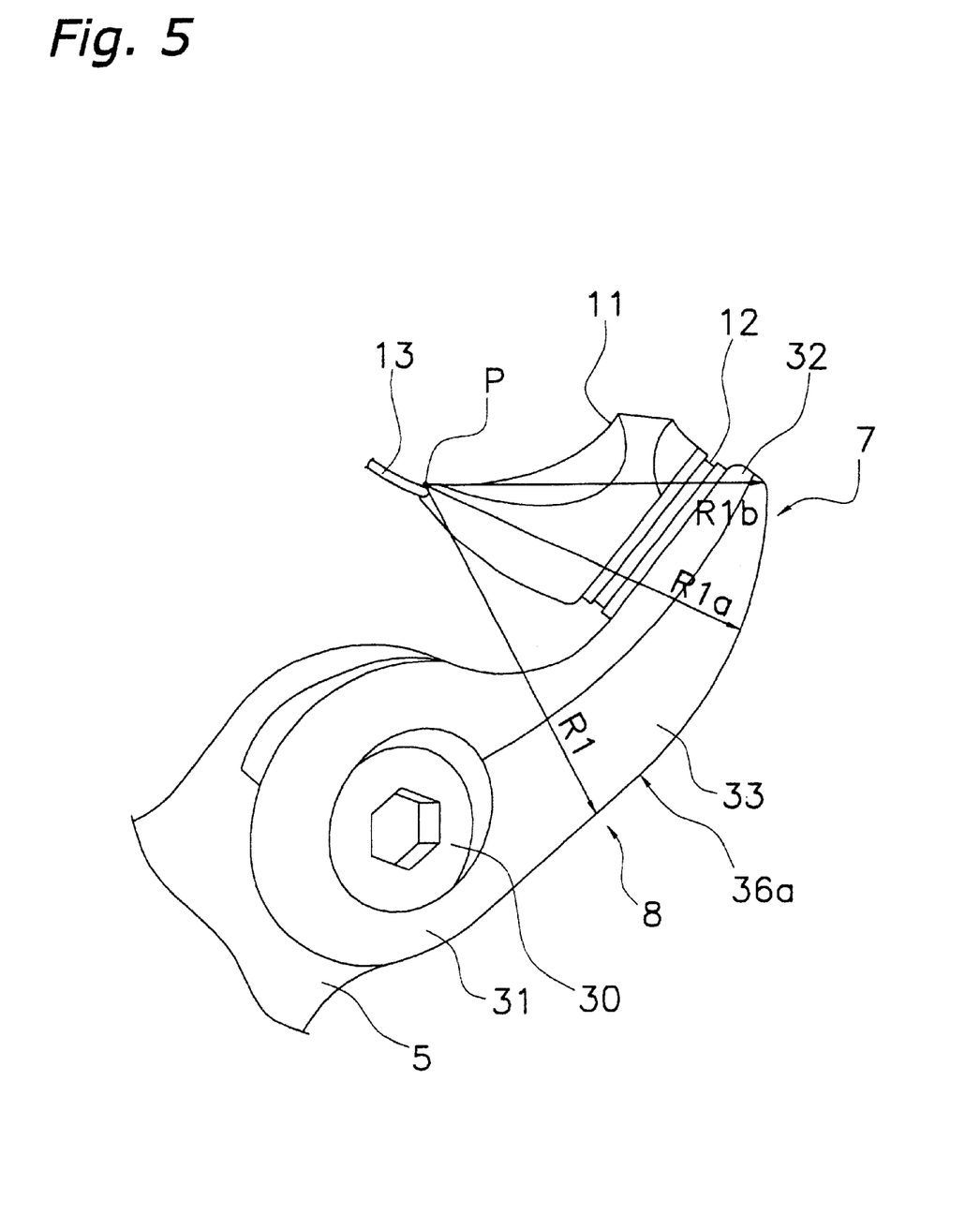
FIG. 5 is an oblique drawing of bail-arm essentials on the first bail-support member end.

The first bail-support member 8 has, as shown in FIGS. 4 and 5: a round attaching portion 31 pivotally attached to the first rotor arm 5 by a fastening bolt 30; a round roller support portion 32 into which the stationary shaft 10 is affixed, and into which the line roller 12 is fitted; and a connecting portion 33 molded to be of approximately uniform thickness, which connects the attaching portion 31 and the roller support portion 32. The roller support portion 32 is disposed at the position in which the attaching portion 31 is twisted, and a stepped through-hole 34 (see FIG. 2) is formed therein. A fixing screw 35 for affixing the stationary shaft 10 to the first bail-support member 8 penetrates the through-hole 34.

A longitudinally oriented ridgeline 36a in the outer periphery 36 of the first bail-support member 8 lies on a sphere whose radius is a first distance R1, as shown in FIG. 5, that is the maximum distance from a reference point P—which is the junction (point where a step-off occurs) between the stationary-shaft cover 11 and the bail 13—to the ridgeline 36a. The first bail-support member 8 is formed such that distances R1a, R1b from the reference point P to the ridgeline 36a become gradually shorter than the first distance R1 in a direction heading outward. That is, the conformation is such the distance R1b is made shorter than distance R1a. Likewise, a ridgeline 36b in the outer periphery 36 of first bail-support member 8 oriented intersecting its longitudinal direction lies on a sphere whose radius is a second distance R2, as shown in FIG. 3, that is the maximum distance from the reference point P to the ridgeline (outer periphery in a cross-section viewed from above) 36b. The first bail-support member 8 is formed such that distances R2a from the reference point P to the ridgeline 36b become gradually shorter than the second distance R2 in a direction heading outward. Here, the second distance R2 is the same length as the first distance R1.

By establishing the contour of the outer periphery 36 to be within such bounds, even if, for example, a line snarl arises at the reference point P and the fishing line snags on the outer periphery of the first bail-support member 8, the line-retrieving operation shifts the snag position on the outer periphery of the first bail-support member 8 outward—where the reference point P is center—and it comes right off, simultaneously with which the line snarl at the reference point P is disentangled. Accordingly, line snarls are readily unsnarled.

Figure 6:
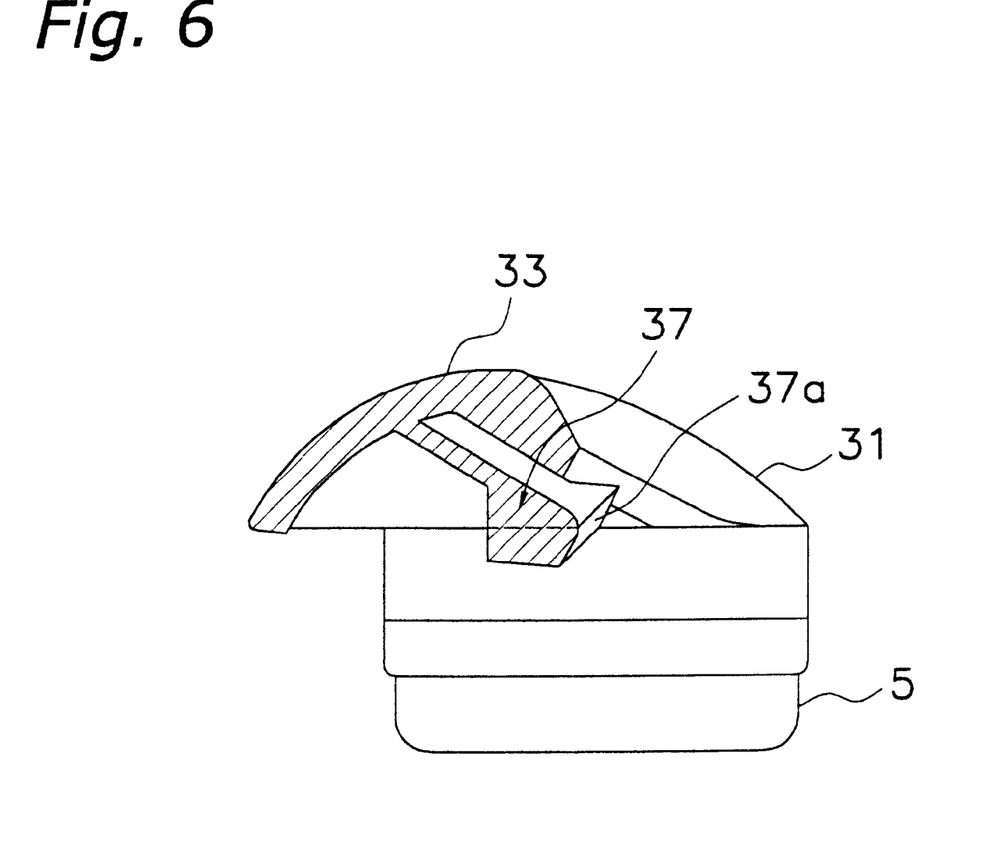
FIG. 6 is a view of VI—VI section from FIG. 4.

A line-slack preventing part 37 having a fishing-line piloting surface 37a for piloting fishing line toward the line roller 12, and a line-slack preventing surface 37b formed in—where it is situated projecting inward beyond the rest of—the connecting portion 33 that is formed integrally with the first bail-support member 8 at approximately uniform thickness as shown in FIG. 6. The line-slack preventing part 37 is a rib formed on the connecting portion 33, jutting in the direction that the stationary shaft 10 projects; and the fishing-line piloting surface 37a is formed on the fore end of the rib, sloping toward the outer circumferential surface of line roller 12. The line-slack preventing surface 37b is situated in opposition to the line roller 12. Even if slack in the fishing line occurs and the line parts off the line roller 12, the line-slack preventing part 37 thus guides the parted away fishing line toward the line roller 12, which therefore prevents the inconvenience of line slack mishaps.

Figure 7:
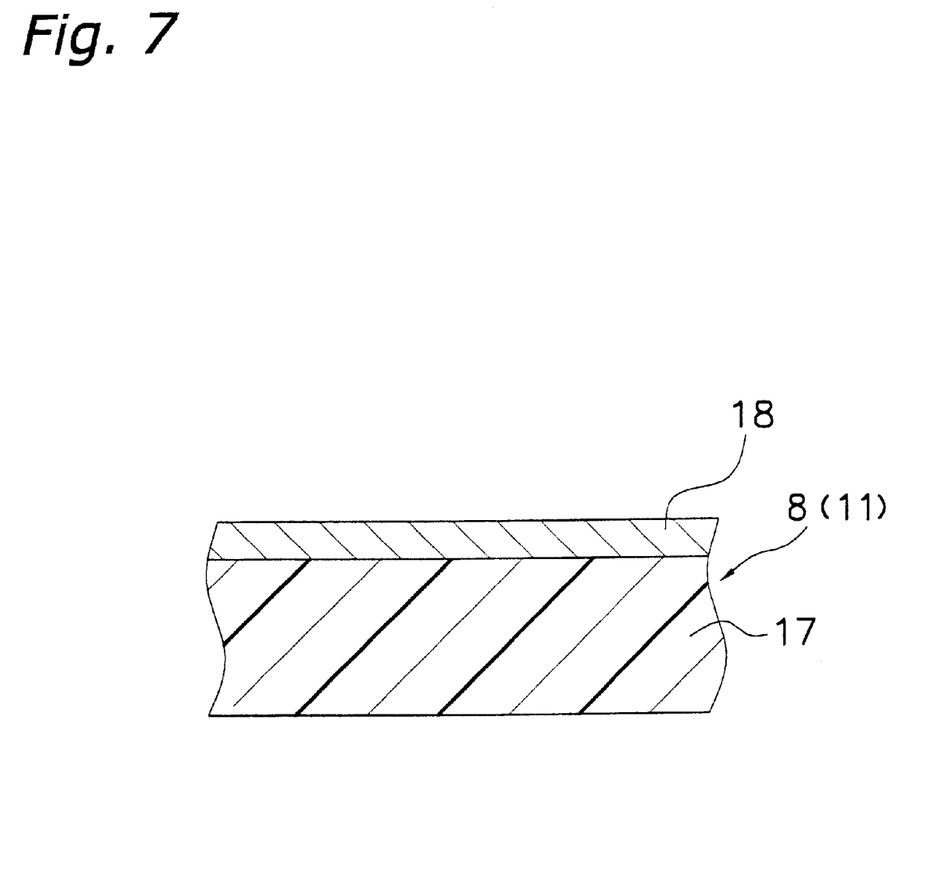
FIG. 7 is a schematic sectional view of the first bail-support member.

As indicated in FIG. 7, the first bail-support member 8 has as a parent material part a body section 17 made of a synthetic resin, and a plating layer 18 as a hard coating-film formed on the outer periphery of the body section 17. The body section 17 is a component made of synthetic resin in which 50% each of ABS resin and PC resin are mixed. The mixing proportions of the ABS resin and the PC resin may be in a range from 40:60 to 60:40. The range being as such will sustain the strength of a first bail-support member 8 manufactured from the synthetic resin obtained, and ease the formation of the plating layer 18 superficially thereon. The plating layer 18 is for example a palladium (Pd) plating layer formed by a chemical plating method that is a non-electrolytic plating technique. This sort of palladium plating layer is low-cost compared with a chrome plating layer; moreover the fact that it makes the surface smooth means that the fishing line slides better, and further, the fact that it is of a higher hardness than synthetic resins means that it is not liable to become scratched. Likewise, the metallic luster yields stages a classic feel, and heightens durability.

Herein, the plating layer 18 is for example a palladium (Pd) plating layer formed according to an electroless plating process. In this case, a hard coating-film may be formed at less cost than chrome or like plating through electrolytic plating means, and at the same time, the surface is made more even and smooth, which makes the fishing line slide easily. Therefore, even if slack in the fishing line occurs and the line scrapes on the outer periphery 36, the outer periphery is not liable to become scratched.

The bail 13 consists of a wire made of a shape-memory alloy having super-elastic properties, such as Ni—Ti, and either end is, for example, crimp-fastened to the second bail-support member 9 and the stationary-shaft cover 11. The bail 13 is disposed curving convexly outward in a spool-4-encompassing orientation, and leads the fishing line onto the stationary-shaft cover 11.

The stationary shaft 10 is a component made of a metal such as a stainless alloy, and as shown in FIG. 2, its basal end extends from the stationary-shaft cover 11, and its tip end is fixed by means of a fastening screw 35 to the roller support portion 32 formed on the first bail-support member 8. The roller support portion 32 is formed integrally with, and projecting in a saucer shape from, the fore end of the first bail-support member 8. Further, the stationary shaft 10 is set into the roller support portion 32 to locate it in the rotational direction so that the apex of the stationary-shaft cover 11 is directed in a predetermined orientation.

The stationary-shaft cover 11 is a component made of synthetic resin, and its connection to the stationary shaft 10 determines its position in the rotational direction. In form the stationary-shaft cover 11 is, as shown in FIG. 2, roughly a round cone whose apex is askew from the center; and its apex 11a is oriented—with the axial center of the stationary shaft 10 as a reference—heading in the reel rear direction and at the same time outward in the diametrical direction of the spool 4. The bail 13 is joined smoothly in the vicinity of the apex 11a of the round cone with its ridgeline portion 11b. The joint between the bail 13 and the stationary-shaft cover 11 is positioned at the apex 11a of the round cone. Further, a recessed void 11d is formed in a ridgeline portion 11c on the side of the stationary-shaft cover 11 opposite its fishing-line guiding side.

The stationary-shaft cover 11 too has as a parent material part a body section 17, and a plating layer 18 as a hard coating-film formed on the surface of the body section 17. The body section 17 is a component made of synthetic resin in which 50% each of ABS resin and PC resin are mixed. The mixing proportions of the ABS resin and the PC resin may be in a range from 40:60 to 60:40. The range being as such will sustain the strength of a stationary-shaft cover 11 manufactured from the synthetic resin obtained, and ease the formation of the plating layer 18 superficially thereon.

The line roller 12 is an approximately tubular component made of a metal such as a stainless alloy, and is rotatively carried on the stationary shaft 10 via a bearing 20. The bearing 20 is fitted over the stationary shaft 10, between the roller support portion 32 and the stationary-shaft cover 11. One end of an inner race 20a of the bearing 20 abuts on the roller support portion 32, and the other end abuts on a spacer 21 disposed in between it and the stationary-shaft cover 11. The inner race 20a is thereby located in the axial direction.

A circumferential groove 12a that is a guide portion for guiding fishing line onto the spool 4 is formed in the outer peripheral surface of the line roller 12, which likewise is engaged, immovably in the stationary-shaft cover 11 direction, onto an outer race 20b of the bearing 20. On its inner circumferential surface the line roller 12 has an interlock portion 12b that juts inward to lock the end face of the bearing 20 outer race 20b on the roller support portion 32 side. This immobilizes the line roller 12 in the stationary-shaft cover 11 direction, and makes it so that a slight gap is always formed between the line roller 12 and the stationary-shaft cover 11.

A thrust-receiving ring 22 made of a synthetic resin such as polyacetyl is disposed between the end face of the liner roller 12 on the roller support portion 32 side, and the roller support portion 32. The thrust-receiving ring 22 prevents the line roller 12 from direct contact with the roller support portion 32.

Fishing-Line Guiding Action

When casting, the bail arm 7 is flipped over into the line-releasing posture, and the fishing rod is flung out forward. Then the lure or like terminal tackle under its own weight reels out fishing line from the spool 4. In this situation, sometimes the fishing line scrapes on the first bail-support member 8 when the line goes slack due to the impact of winds and the bail arm 7 is returned to the line-retrieving position. Even in such instances, the fact that the plating layer 18 that is a hard coating-film is formed on the outer periphery 36 of the first bail-support member 8 means that the first bail-support member 8 is not liable to become scratched. Likewise, the fact that the outer periphery 36 of the first bail-support member 8 in contour is formed so that it gradually becomes smaller in diameter means that even if a snarl arises between the outer periphery 36 and the reference point P due to slack in the fishing line, the fishing line is not liable to snag on the first bail-support member 8.

When the rotor 3 is rotated by the handle 1 after casting, a bail-returning mechanism returns the bail arm 7 into the line-retrieving posture. By the rotation of the rotor 3, the fishing line, passing from the bail 13 over the stationary-shaft cover 11, is then guided onto the line roller 12 and wound onto the spool 4. At this time, the fishing line is guided onto the spool 4 running along the circumferential groove 12b in the line roller 12. Herein, the plating layer 18 formed on the surface of the stationary-shaft cover 11 makes its surface smooth, whereby the fishing line is smoothly guided. Likewise, the stationary-shaft cover 11 surface being made to have a high degree of hardness means that the surface is not liable to become scratched though the fishing line shifts while sliding over the surface.

Here, by the working of the bearing 20 accompanying the passage of the fishing line, the line roller 12 rotates lightly, thereby letting the fishing line pass smoothly without being subjected to a large resistive force.

Furthermore, though due to the impact of winds the fishing line comes off the line roller 12 and the line goes slack, the fact that on the first bail-support member 8 the line-slack preventing part 37 projecting toward the spool 4 is formed means that the parted-away fishing line is guided once more onto the line roller 12, and inconvenience owing to line slack is not liable to occur.

Other Embodiments (a) The line-slack preventing part 37 is formed by a rib on the first bail-support member in the foregoing embodiment, but the form of the unitarily composed line-slack preventing part 37 is not limited to a rib.

(b) In the foregoing embodiment, the first bail-support member 8 is disposed outward of the first rotor arm 5, but the first bail-support member 8 may be arranged inward of the first rotor arm 5.

Figure 8:
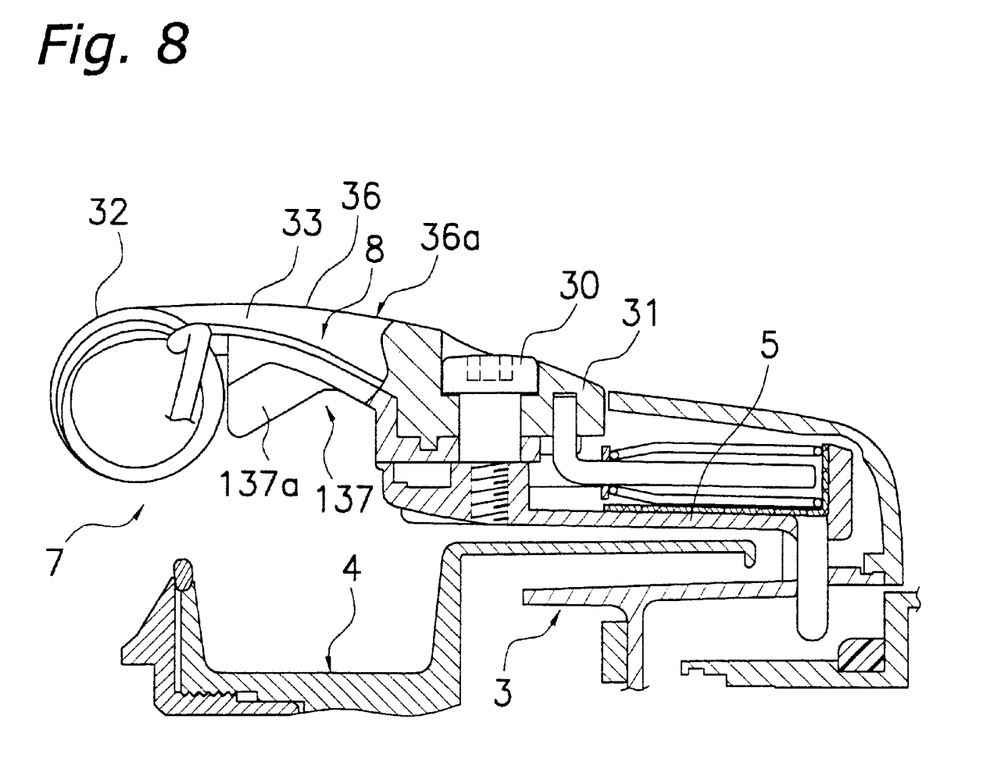
FIG. 8 is a view, corresponding to FIG. 4, of another embodiment.
Figure 9:
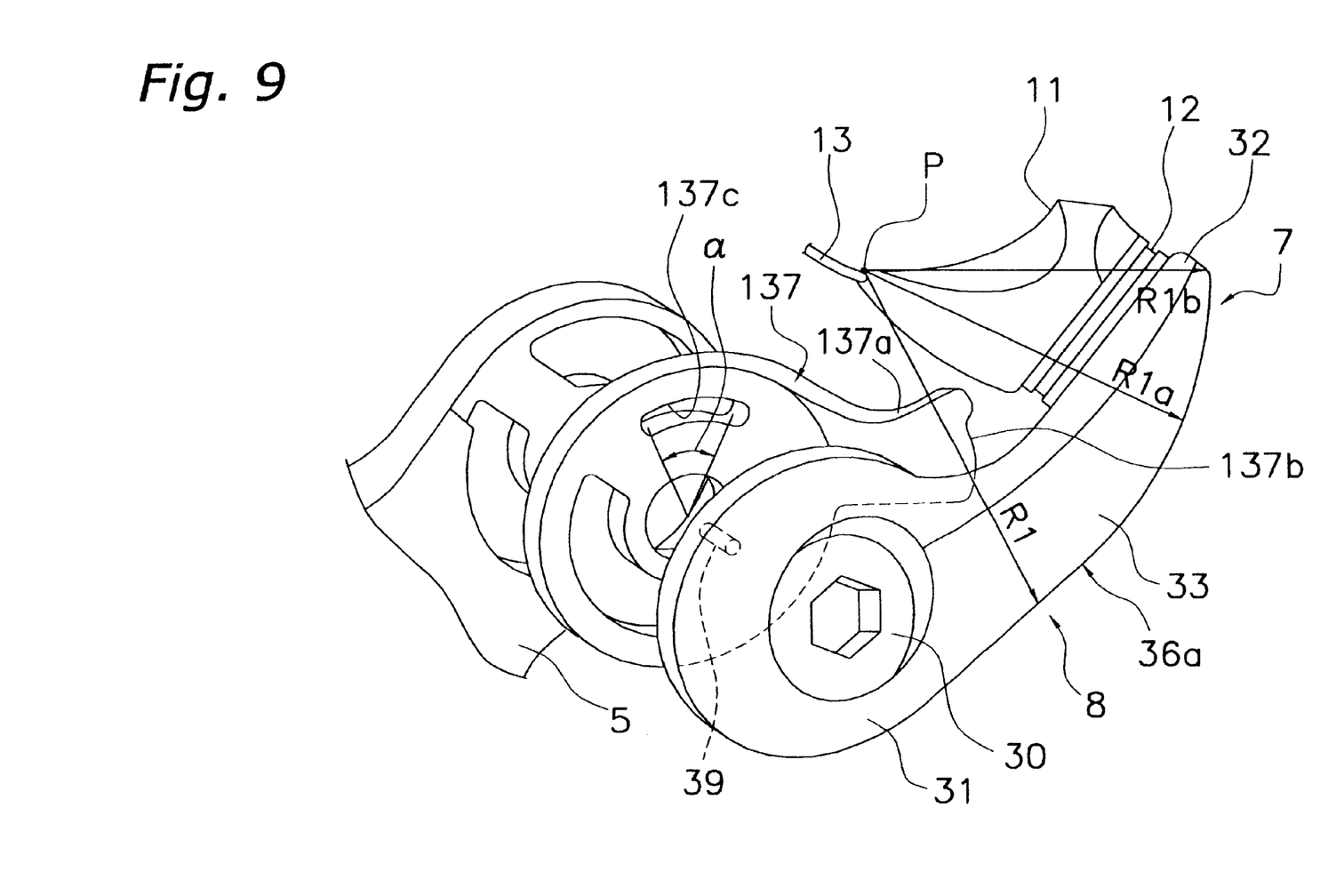
FIG. 9 is a view, corresponding to FIG. 5, of the other embodiment.

(c) In the foregoing embodiment, the line-slack preventing part 37 is formed integrally with the first bail-support member. However, the line-slack preventing part may be established separately, as indicated in FIGS. 8 and 9. A line-slack preventing part 137 is pivotally mounted, together with the first bail-support member 8, on the first rotor arm 5 by means of a fastening bolt 30. The line-slack preventing part 137 is a plate-shaped member shaped to follow the inside surface of the first bail-support member 8, and includes a fishing-line piloting surface 137a that pilots the fishing line toward the line roller 12. The fishing-line piloting surface 137a juts out in the direction in which the stationary shaft 10 projects, while being a surface that intersects that axial direction. The line-slack preventing part 137 further has a fishing-line engaging recess 137b, and a linking recess 137c. The fishing-line engaging recess 137b is provided sunk in from the projecting area on the fore end of the line-slack preventing part 137, where it is formed to enable engaging a line-dropping fishing line. The fishing-line engaging recess 137b is slightly exposed from the first bail-support member 8 when in the line-retrieving posture. The linking recess 137c is a slot in the surface opposing the first bail-support member 8, contoured in a round arc that forms a predetermined angle α, and into which an interlocking nib 39 projecting from the first bail-support member 8 interlocks. Herein, when from the line-retrieving posture to the line-releasing posture the first bail-support member 8 pivots the predetermined angle α, the line-slack preventing part 137 begins pivoting. Accordingly, the line-slack preventing part 137 and the first bail-support member 8 pivot with a phase difference of the predetermined angle α. On the other hand, when going back from the line-releasing posture to the line-retrieving posture, by means of a not-illustrated interlocking structure, they return at the same phase. Therefore, pivoting into the line-releasing posture exposes the fishing-line engaging recess 137b extensively, which keeps fishing line parting off the line roller 12 from getting in the way.

Figure 10:
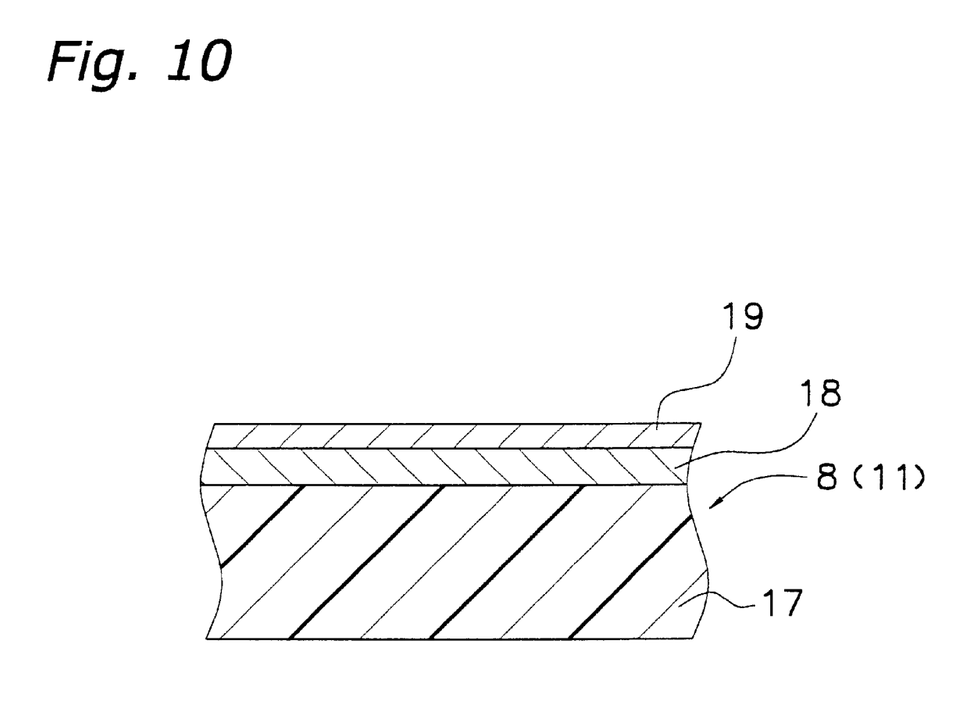
FIG. 10 is a view, corresponding to FIG. 7, of another embodiment.
Figure 11:
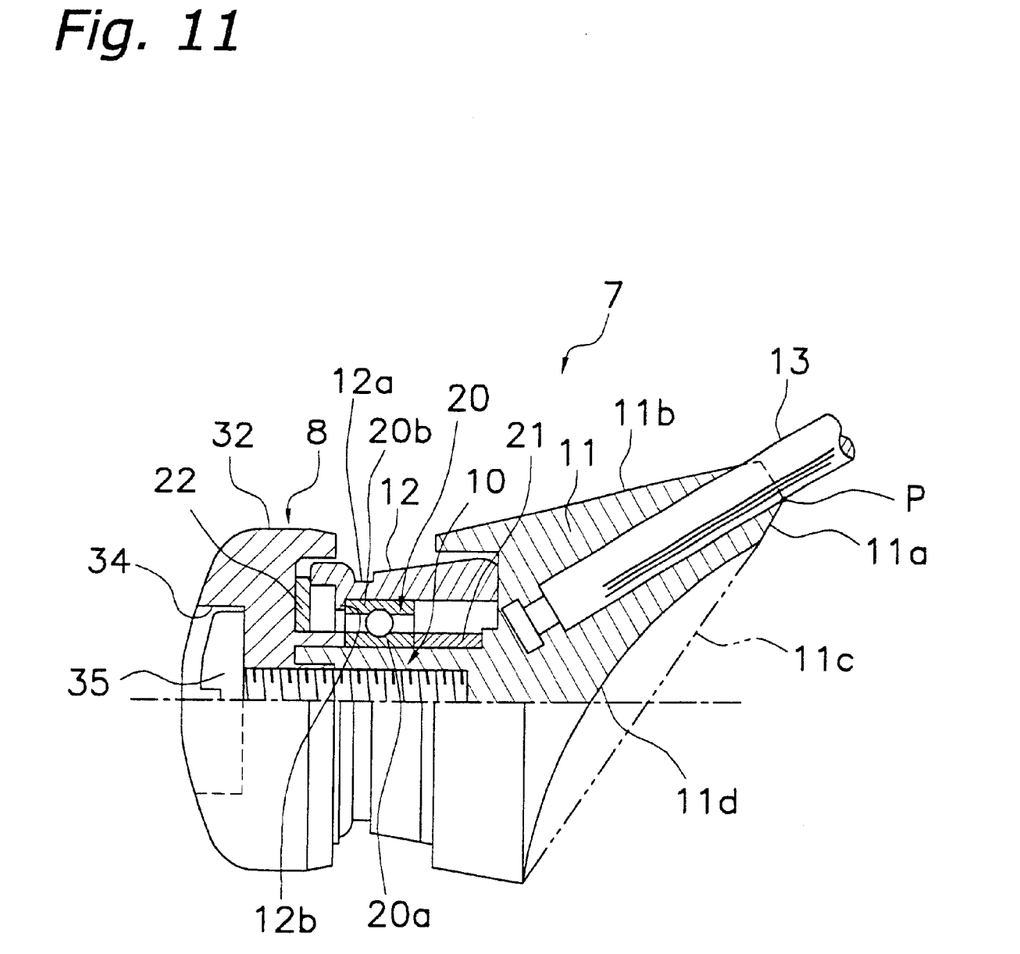
FIG. 11 is a view, corresponding to FIG. 2, of another embodiment.

(d) While the plating layer 18 is formed on the surface of the body section 17 in the foregoing embodiment, as shown in FIG. 10, a metallic or non-metallic thin film layer 19 further may be built—by a method of forming a hard electrolytic plating layer or any type of thin film—onto the plating layer 18 as a surface coating-film layer. For example, a thin film layer 19 made out of nickel-chromium plating may further be formed onto the plating layer 18 by an electrolytic plating method.

(e) A plating layer as a hard coating-film derived by a non-electrolytic plating method was illustrated in the foregoing embodiment, but methods of forming the thin metallic film layer are not thereby limited, and include every type of thin-film formation method, such as: every sort of plating method, such as electrolytic plating methods and non-electrolytic plating methods; every sort of physical vapor deposition (PVD) method, such as vacuum vapor-deposition methods, sputtering methods, and ionic plating; as well as every sort of chemical vapor-deposition method, such as plasma CVD and organic metal CVD. Likewise, the hard coating-film may be formed by a hardening-treated paint film built on by a paint-coating process. The paint-film hardening process in this case lets the hard coating-film be formed at low cost.

(f) A mixed resin of ABS resin, PC resin, and polyester resin was utilized as the synthetic resin in the foregoing embodiment, but it be any one of: monomers thereof, polypropylene resins, or vinyl chloride resins; or may be a synthetic resin manufacture in which these are mixed.

(g) In the foregoing embodiment the first bail-support member 8 is synthetic-resin manufactured, but may be formed of a ceramic with the chief component being a metal oxide substance created by a hard-coating-film anodizing process utilizing a comparatively soft metal such as an aluminum alloy. In this case a hard coating-film may be simply obtained even using a comparatively soft metal.

(h) The stationary-shaft cover 11 is made of synthetic resin, and the stationary shaft 10 is made of a stainless alloy in the foregoing embodiment, but the stationary-shaft cover 11 may be made of metal, to form it unitarily with the stationary shaft 10. In this case, a hard coating-film may be formed on the surface of the stationary-shaft cover 11.

Effects of Invention

In a spinning-reel fishing-line guiding mechanism according to the present invention, because a line-slack preventing part is arranged on, projecting beyond the rest of, the side of the first bail-support member from which the stationary shaft projects, and moreover because a fishing-line piloting surface that pilots the fishing line toward the line roller is provided on the line-slack preventing part, though the fishing line parts off the line roller, it is immediately guided back onto the line roller. Consequently, even if the fishing-line tension weakens and the line goes slack, it is unlikely to bring about inconvenience.

In a spinning-reel fishing-line guiding mechanism according to another invention, the fact that a hard coating-film is formed on the outer periphery of the first bail-support member lends the outer periphery a high degree of hardness to keep the outer periphery of the first bail-support member from becoming scratched though fishing line gone slack scrapes on it. Moreover, wherein a smooth surface is imparted by a hard metallic coating-film, fishing line slides easily on the first bail-support member, which keeps the fishing line from snarling on the first bail-support member.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A fishing-line guiding mechanism for use in a spinning-reel having a spool, a reel body, and a rotor with first and second rotor arms, said fishing-line guiding mechanism being provided on spool side ends of the first and second rotor arms of the rotor, said fishing-line guiding mechanism being pivotable between a line-guiding posture and a line-releasing posture, said fishing-line guiding mechanism guiding a fishing-line onto the spool when in the line-guiding posture, said fishing-line guiding mechanism comprising:

first and second bail-support members respectively fitted pivotally to the spool side ends of the first and second rotor arms;

a line roller provided on a spool side end of said first bail-support member, for guiding the fishing line onto the spool;

a stationary shaft projecting from the said spool side end of said first bail-support member, for rotatively carrying said line roller;

a stationary shaft cover having a larger outer diameter than an outer diameter of said liner roller, said stationary shaft cover being provided on a spool side end of said stationary shaft;

a bail interconnecting said stationary shaft cover and said second bail-support member, for guiding the fishing line onto said line roller; and a line-slack preventing part provided on said first bail-support member on a side from which said stationary shaft projects, such that said line-slack preventing part projects from said stationary shaft side of said first bail-support member, said line-slack preventing part having a fishing-line piloting surface for piloting the fishing line toward said line roller.

2. The fishing-line guiding mechanism set forth in claim 1, wherein said line roller has a fishing-line guiding section that guides the fishing-line onto the spool, and said line-slack preventing part has a line-slack preventing portion situated opposing the fishing-line guiding section of said line roller.

3. The fishing-line guiding mechanism set forth in claim 2, wherein said line-slack preventing part has an engaging recess that is engageable with the fishing line and is situated opposing said line roller.

4. The fishing-line guiding mechanism set forth in claim 1, wherein said first bail-support member has a round attaching portion, a round roller-support portion, and a connecting portion, said attaching portion being pivotally attachable to the first rotor arm, said stationary shaft being fixed to said roller support portion, said line roller being coupled to said roller support portion, said connecting portion being molded at an approximately uniform thickness for connecting said attaching portion and said roller support portion, and said line-slack preventing part includes a rib formed on said connecting portion and projecting in a direction of the projection of said stationary shaft.

5. The fishing-line guiding mechanism set forth in claim 1, wherein said line-slack preventing part includes a pivoting member disposed on a spool side of said first bail-support member, said pivoting member being mounted on the first rotor arm so as to be coaxial with said first bail-support member and to pivot in sync with said first bail-support member.

6. The fishing-line guiding mechanism as set forth in claim 5, wherein said pivoting member, when said first bail-support member pivots from the line-guiding posture to the line-releasing posture, pivots lagging behind said first bail-support member by a predetermined angle.

7. The fishing-line guiding mechanism set forth in claim 1, wherein an outer peripheral portion of said first bail-support member is formed such that said outer peripheral portion of said first bail-support member fits within a sphere whose center is a predetermined reference point and whose radius is a first distance, which is a maximum distance between said outer peripheral portion of said first bail-support member and said predetermined reference point, said outer peripheral portion of said first bail-support member being formed into a curved-surface contour such that the distance between said outer peripheral portion and said reference point becomes gradually smaller than said first distance in a direction heading outward.

8. The fishing-line guiding mechanism set forth in claim 7, wherein said reference point is a juncture between said stationary shaft cover and said bail.

9. The fishing-line guiding mechanism set forth in claim 1, wherein said first and second bail-support members are pivotally supported by the first and second rotor arms on outer sides of said first and second bail-support members.

10. The fishing-line guiding mechanism set forth in claim 1, wherein said first bail-support member has a hard coating film on its outer periphery.

11. The fishing-line guiding mechanism set forth in claim 10, wherein said first bail-support member is made of synthetic resin, and said hard coating film is formed by a metal-plating process.

12. The fishing-line guiding mechanism set forth in claim 11, wherein one of said first bail-support member and said stationary-shaft cover is made of any one of: ABS (acrylonitrile butadiene styrene) resin, PC (polycarbonate) resin, polyester resin, polypropylene resin, and vinyl chloride resin, or a synthetic resin that mixes at least two of ABS (acrylonitrile butadiene styrene) resin, PC (polycarbonate) resin, polyester resin, polypropylene resin, and vinyl chloride resin.

13. The fishing-line guiding mechanism set forth in claim 12, wherein one of said first bail-support member and said stationary shaft cover is made of a synthetic resin in which said ABS and said PC are mixed in a range of 40:60 to 60:40.

14. The fishing-line guiding mechanism set forth in claim 11, wherein said hard coating film is a palladium (Pd) plating layer formed by means of an electroless plating process.

15. The fishing-line guiding mechanism set forth in claim 10, wherein said first bail-support member is made of synthetic resin, and said hard coating film is formed by a process of hardening a paint film formed through a paint-coating process.

16. The fishing-line guiding mechanism set forth in claim 10, wherein said stationary shaft cover is made of synthetic resin, and said hard coating-film is formed on a surface of said synthetic resin.

17. The fishing-line guiding mechanism set forth in claim 16, wherein a fore-end of said stationary-shaft cover has a generally conical contour defining a ridgeline portion and a conical apex, and one end of said bail is joined smoothly with the ridgeline portion in a vicinity of the conical apex of said stationary shaft cover.

18. The fishing-line guiding mechanism set forth in claim 10, wherein said stationary shaft cover is made of metal and is formed integrally with said stationary shaft.

19. The fishing-line guiding mechanism set forth in claims 10, wherein said first bail-support member is made of a light metal, and said hard coating film is a ceramic whose chief component is a metal oxide substance.

20. A spinning-reel comprising a reel body having a handle;

a rotor coupled rotatively to said reel body, said rotor having first and second rotor arms and being coupled to said reel body, and a spool arranged on said reel body on a side to which said rotor is coupled;

a fishing line guiding mechanism provided on spool side ends of said first and second rotor arms of the rotor, said fishing-line guiding mechanism being pivotable between a line-guiding posture and a line-releasing posture, said fishing-line guiding mechanism guiding a fishing-line onto the spool when in the line-guiding posture, said fishing-line guiding mechanism having first and second bail-support members respectively fitted pivotally to the spool side ends of the first and second rotor arms;

a line roller provided on a spool side end of said first bail-support member, for guiding the fishing line onto the spool;

a stationary shaft projecting from the said spool side end of said first bail-support member, for rotatively carrying said line roller;

a stationary shaft cover having a larger outer diameter than an outer diameter of said liner roller, said stationary shaft cover being provided on a spool side end of said stationary shaft;

a bail interconnecting said stationary shaft cover and said second bail-support member, for guiding the fishing line onto said line roller; and a line-slack preventing part provided on said first bail-support member on a side from which said stationary shaft projects, such that said line-slack preventing part projects from said stationary shaft side of said first bail-support member, said line-slack preventing part having a fishing-line piloting surface for piloting the fishing line toward said line roller.

* * * * *